(12) United States Patent
Archer et al.

(10) Patent No.: US 8,464,320 B2
(45) Date of Patent: Jun. 11, 2013

(54) SYSTEM AND METHOD FOR PROVIDING AUTHENTICATION CONTINUITY

(75) Inventors: Steven Thomas Archer, Dallas, TX (US); Lawrence J. Zaykowski, Old Forge, PA (US); Kristopher Alan Pate, Sachse, TX (US); Robert Angelo Clavenna, II, Lucas, TX (US); Paul V. Hubner, McKinney, TX (US); Jack Mitchell Farris, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 400 days.

(21) Appl. No.: 12/785,517

(22) Filed: May 24, 2010

(65) Prior Publication Data
US 2011/0289564 A1 Nov. 24, 2011

(51) Int. Cl.
G06F 12/14 (2006.01)
G06F 17/00 (2006.01)
G06F 7/04 (2006.01)
G06F 15/16 (2006.01)
G06F 17/30 (2006.01)
H04L 29/06 (2006.01)

(52) U.S. Cl.
USPC .................. 726/4; 726/1; 713/186; 709/224

(58) Field of Classification Search
None
See application file for complete search history.

(56) References Cited

U.S. PATENT DOCUMENTS

| 7,822,851 | B2 * | 10/2010 | Hogaboom et al. | 709/224 |
| 2008/0155094 | A1 * | 6/2008 | Roese et al. | 709/224 |
| 2008/0271109 | A1 * | 10/2008 | Singh et al. | 726/1 |
| 2009/0037743 | A1 * | 2/2009 | Narayanaswami | 713/186 |

* cited by examiner

*Primary Examiner* — Shin-Hon Chen (57) ABSTRACT

A computer-implemented method may include receiving first monitored information relating to a user at a time of initial user authentication with a particular application or resource. It may be determined that a second authentication is required at a second time subsequent to the time of initial user authentication. Second monitored information may be captured at the second time. The second monitored information may be compared to the first monitored information to determine whether continued authentication is maintained. Access to the particular application or resource when it is determined that continued authentication is not maintained.

19 Claims, 6 Drawing Sheets

SYSTEM AND METHOD FOR PROVIDING AUTHENTICATION CONTINUITY

BACKGROUND

Users are often required to authenticate their identities prior to accessing sensitive or secure information, facilities, or equipment. Typical authentication systems include username/password combinations, and biometric information, such as fingerprints and retinal scans. Upon successful authentication, the secured resources are made available to the user indefinitely, or until the user logs out.

DETAILED DESCRIPTION OF PREFERRED EMBODIMENTS

The following detailed description refers to the accompanying drawings. The same reference numbers in different drawings may identify the same or similar elements. Also, the following detailed description does not limit the embodiments disclosed herein.

Figure 1:
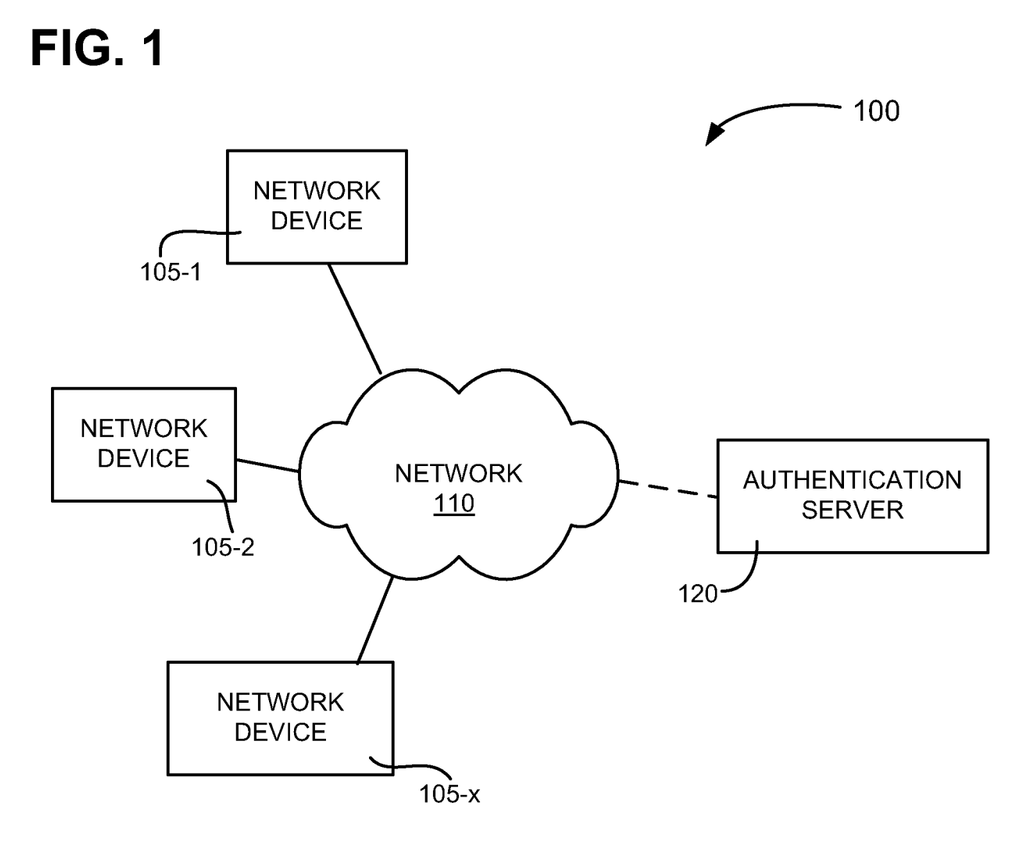
FIG. 1 illustrates a block diagram of an exemplary environment 100 in which systems and methods described herein may be implemented.

FIG. 1 is a block diagram of an exemplary environment 100 in which systems and methods described herein may be implemented. As shown, environment 100 may include a number of network devices 105-1, 105-2, and 105-x (collectively "network devices 105" and individually "network device 105") connected to network 110, either directly or indirectly. Environment 100 may also include an authentication server 120 connected to or having access to information relating to users and systems connected to network devices 105 and/or network 110.

Consistent with embodiments described herein, network devices 105 may include any device that is connected to network 110. For example, suitable network devices 105 may include networking or information technology (IT) related devices, such as workstations, servers, routers, mainframes, monitors, printers, photocopiers, and telephones, as well as access control/detection devices, such as keypads, card readers (e.g., radio frequency identification (RFID), magnetic, or near-field communication (NFC) card readers), Bluetooth® devices, biometric devices (e.g., fingerprint, palm print, facial recognition, or retinal scanners), weight sensors, heat sensors, cameras, or location monitoring devices, such as global positioning satellite (GPS) system devices, proximity location devices (e.g., Bluetooth™, RFID, or NFC-based devices). As described below, network devices 105 may work together to provide enhanced authenticated identity controls.

In one implementation, a network device 105 may include sensors for monitoring a physical environment associated with another network device 105 or combination of network devices 105. For example, network device 105-1 may include a workstation and network device 105-2 may include a facial recognition device in proximity to workstation 105-1. In one embodiment, a security layer (also referred to as a "shim" application) executing security policies on workstation 105-1 (or, alternatively, via authentication server 120) may receive information from facial recognition device 105-2 (or, alternatively, authentication server 120). The received information may be used to update or modify access to workstation 105-1.

In some implementations, the security policies may be application or resource-based. In such instances, depending on the information received from facial recognition device 105-2, for example, certain resources (e.g., applications, network connections, web sites, services, etc.) may be disabled or blocked, while other resources may remain available.

Network 110 may include a local area network (LAN), a wide area network (WAN), a metropolitan area network (MAN), a telephone network, such as the Public Switched Telephone Network (PSTN), an intranet, a portion of the Internet, an optical fiber-based network, or a combination of networks. In some implementations, network devices 105 may be specifically related to a particular entity, such as a company, a governmental body, etc.

Network 110 may include network devices that are not shown, such as voice gateways, routers, switches, firewalls, and/or servers. Network 110 may include a hardwired network using wired conductors and/or optical fibers and/or may be a wireless network using free-space optical and/or radio frequency (RF) transmission paths. Implementations of networks and/or devices described herein are not limited to any particular data format, type, and/or protocol.

Authentication server 120 includes any device or combination of devices configured to receive session and monitored information from network devices 105 and identify security rules or policies based on the received information. Identified rules may be used to authenticate a user or, when authentication is not satisfied, to block access to resources or applications when the user (or users) is not authenticated.

The environment described in FIG. 1 is simplified for the purposes of brevity and may include any number of network devices 105, networks 110, or authentication servers 120. In addition, environment 100 may include other devices not depicted in FIG. 1. In some embodiments, environment 100 may include any number of authentication servers 120 operating alone or in concert. Implementations may further include one or more authentication servers 120 residing in a single network or domain, or spread across multiple networks and/or domains. The functionality of authentication server 120 may be implemented in other devices, such as a particular network device 105 (e.g., a desktop computer, laptop, or network device, such as a router, gateway or switch). Additional details regarding the operation of authentication server 120 are set forth below.

Figure 2:
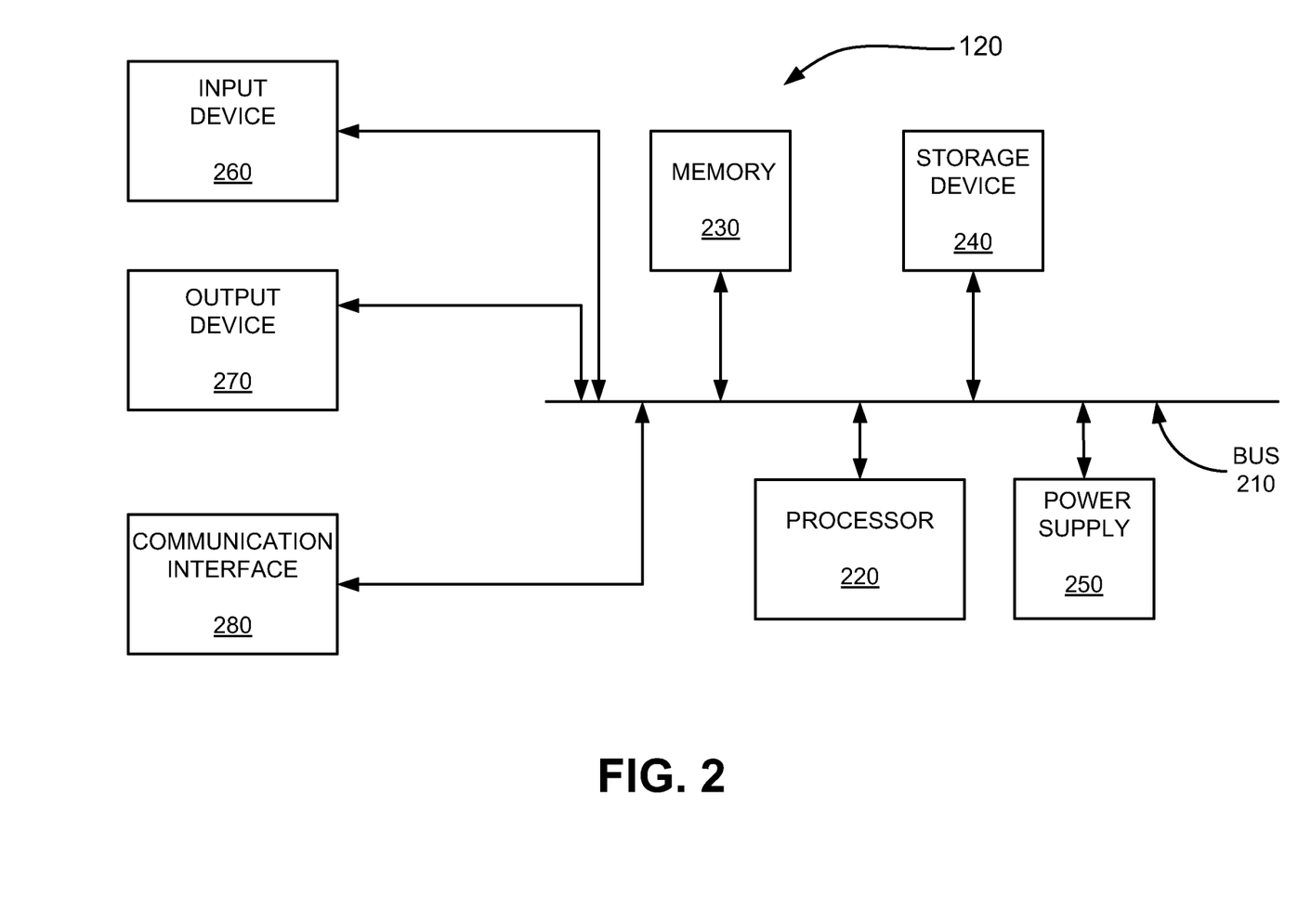
FIG. 2 is a diagram illustrating exemplary components of the network device of FIG. 1.

FIG. 2 is a diagram illustrating components of exemplary network device 105. In some implementations, network devices 105 and authentication server 120 may include similar components. Referring to FIG. 2, network device 105 (e.g., a workstation, monitoring device, etc.) may include bus 210, processor 220, memory 230, storage device 240, power supply 250, input device 260, output device 270, and communication interface 280. Network device 105 may be configured in a number of additional ways and may include other or different components. For example, network device 105 may include additional components, such as one or more modulators, demodulators, encoders, decoders, etc., for processing data.

Bus 210 may include a path that permits communication among the elements of network device 105. Processor 220 may include one or more processors, microprocessors, application specific integrated circuits (ASICs), field programmable gate arrays (FPGAs), or other processing logic that may interpret and execute instructions. Memory 230 may include a random access memory (RAM) or another type of dynamic or static (e.g., read only memory (ROM)) storage device that may store information and instructions for execution by processor 220. Storage device 240 may include a magnetic and/or optical recording medium and its corresponding drive. Power supply 250 may include a battery or other power source powering network device 105.

Input device 260 may permit a user to input information to network device 105, such as a camera, a sensor (e.g., a motion detector), microphone, a keypad, a keyboard, a touch screen, a mouse, a pen, etc. Other exemplary input devices or sensors are described above. Output device 270 may output information to the user, such as a display, a printer, one or more speakers, etc.

Communication interface 280 may include a transceiver that enables network device 105 to communicate with other devices and/or systems, such as other network devices 105 and/or authentication server 120. For example, communication interface 280 may include interfaces, such as a modem or Ethernet interface, for communicating via a network, such as network 110.

In implementations consistent with embodiments described herein, authentication server 120 and/or network devices 105 may perform processing associated with ascertaining and enforcing monitored state authentication policies. Network devices 105 and/or authentication server 120 may perform these operations in response to processor 220 executing sequences of instructions contained in a computer-readable medium, such as memory 230. A computer-readable medium may include a physical or logical memory device. The software instructions may be read into memory 230 from another computer-readable medium, such as data storage device 240, or from another device via communication interface 280. The software instructions contained in memory 230 may cause processor 220 to perform processes that are described below. Alternatively, hard-wired circuitry may be used in place of or in combination with software instructions to implement processes consistent with the embodiments described herein. Thus, implementations described herein are not limited to any specific combination of hardware circuitry and software. For the purposes of this application, a "computer" may be defined as a device, or combination of devices, that performs mathematical or logical operations, or that assembles, stores, correlates, or otherwise processes information.

Figure 3:
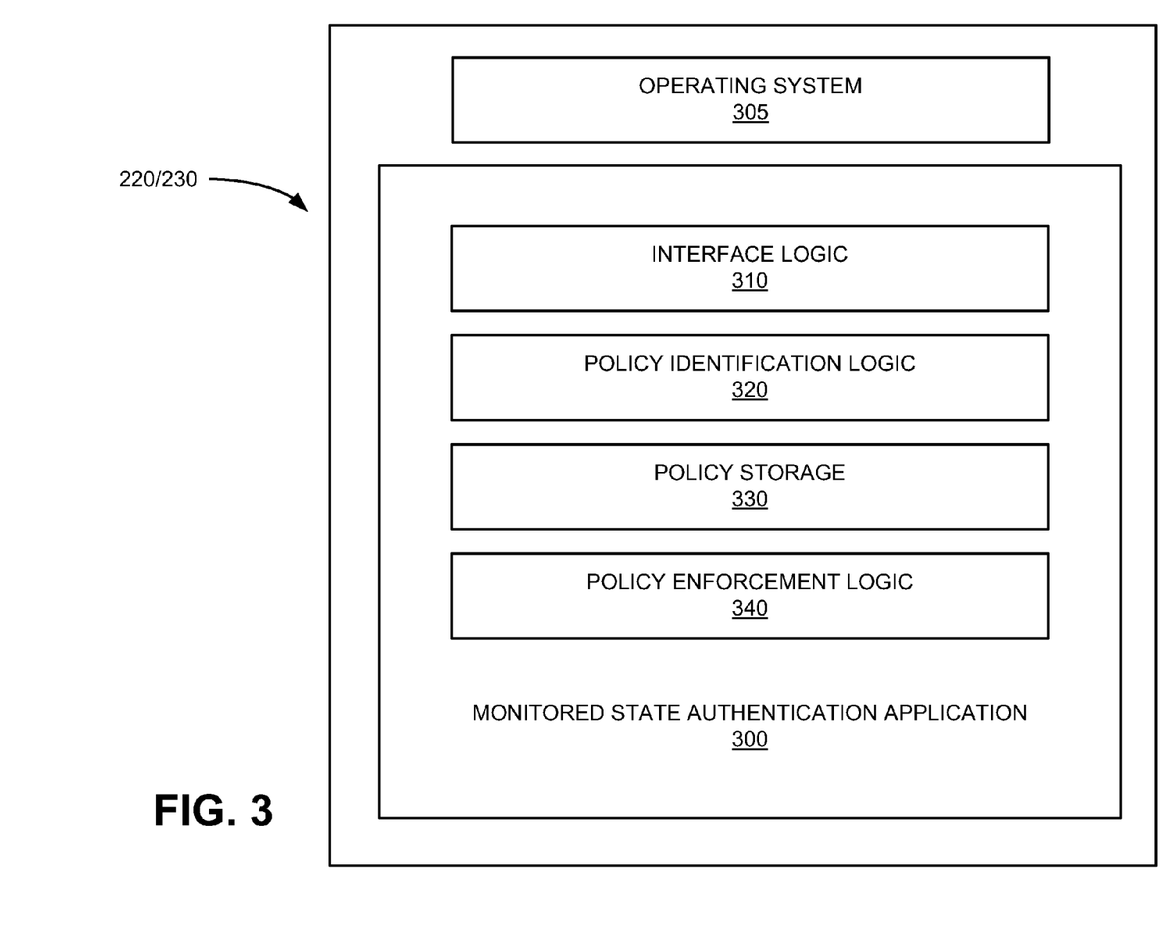
FIG. 3 is a functional block diagram of exemplary components implemented in the network device or authentication server of FIG. 1.

FIG. 3 is a functional block diagram of exemplary components implemented in network device 105 and/or authentication server 120 of FIG. 1. The logical blocks illustrated in FIG. 3 may be implemented in software, hardware, a combination of hardware and software. In alternative implementations, some or all of the components illustrated in FIG. 3 may be implemented in other devices or combinations of devices, such as network devices 105, authentication server 120, and/ or other devices (e.g., firewalls, access points, routers, etc.). Referring to FIG. 3, memory 230 may include operating system 305, and a monitored state authentication application 300 that may include, interface logic 310, policy identification logic 320, policy storage 330, and policy enforcement logic 340. Various logic components illustrated in FIG. 3 may be implemented by processing logic 220 executing one or more programs stored in memory 230. In some implementations, one or more components of FIG. 3 may be implemented in other devices associated with network device 105 and/or authentication server 120. In addition, monitored state authentication application 300 may include a single or more than one executable application.

Operating system 305 may include software instructions for managing hardware and software resources of network device 105. Operating system 305 may manage, for example, its file system, device drivers, communication resources (e.g., radio receiver(s), transmission control protocol (TCP)/IP stack), event notifications, etc. Operating system 305 may include Microsoft Windows, Apple® OS X, a variant of Linux or Unix (e.g., Ubuntu, Red Hat, etc.), an embedded operating system, a mobile operating system, etc.

As described above, monitored state authentication application 300 may be configured to receive session and monitored user information from one or more network devices 105 (e.g., from applications or services executing on a network device), identify and apply authentication/security policy rules based on the received information, and provide session instructions to the applications or services based on the applied rules. In some implementations, monitored state authentication application 300 may be included within a particular network device 105, such as a user workstation. In other implementations, monitored state authentication application 300 may be part of an authentication server 120 connected, as depicted in FIG. 1, to network devices 105 via network 110.

Interface logic 310 may include logic configured to receive information, e.g., from a network device 105, or an application or service executing on network device 105, such as a facial recognition application, an access control system (e.g., a keycard-based access control system), etc. In some implementations, interface logic 310 may include a network interface for receiving information from network device 105 via a network, such as network 110.

As described above, the received information may include information relating to an authenticated security session for a particular resource, service, or application. For example, the received information may include a resource identifier, such as a database identifier, web site or address (e.g., uniform resource locator (URL)), application name, service name, originating network name/number, or session identifier and a user identifier, such as a username, identification number, etc. The information may enable monitored state authentication application 300 to identify applicable security/authentication policies or rules associated with the identified resource and user.

In addition to the authenticated security session information, information received by monitored state authentication application 300 may also include reference "use state" information and active "monitored state" information. User recognition or status information (i.e., "use state" information) may be received at the time of initial user authentication. For example, the use state information may include geographical, or spatial/physical location information, such as GPS coordinates or presence/proximity information relating to the user. In other implementations, the use state information may include facial recognition or other biometric information, heat signature information, weight sensor information, etc. The use state information may be associated with the received resource or service identification information, thereby provided a link between the use state information and the received resource/service identification information.

Together, the resource/user (e.g., "session") information and the use state information (e.g., facial recognition information) and may be established at a time of initial user authentication. In some embodiments, the use state information may include monitoring required for initial user authentication, such as retinal scanning, etc. In other embodiments, the use state information is supplemental to information required for initial authentication.

At times subsequent to initial user authentication, monitored state authentication application 300 may receive active monitored state information that reflects the same identification/monitoring information as the use state information, but at a later point in time. For example, when the use state includes facial recognition information for an individual that initially successfully authenticates access into particular system, the active monitored state information may also include facial recognition at a later point in time.

In some instances, the retrieval of (or request for) monitored state information may be triggered by a particular event or combination of events. The triggering event(s) may be included within the applicable security/authentication policies or rules associated with the identified resource and user. Exemplary triggering events may include monitored events, such as the expiration of a predetermined period of time following the user stepping away from a workstation, etc.

Policy identification logic 320 may be configured to compare the received resource and user identification information and identify one or more associated security/authentication policies. For example, when an initially authenticated user is accessing a confidential accounting system, a high level security rule may be identified and applied, whereas when the same user accesses a word processing system, a low level security rule may be identified and applied. In some implementations, if a security policy matching the user identification and accessed resource is not found, a default authentication policy may be applied.

Granularity may be implemented with respect to applied security rules. The security rules may be based on particular user, user accounts, resource types, time of day, day of week, etc. In addition, any number of monitored criteria may be used in combination, such as a proximity or presence detector (e.g., RFID employee badge, facility access control system, etc.), a network identifier (e.g., IP (Internet protocol) address), etc., in addition to the above-described facial recognition information. In one implementation, policy information may be stored in policy storage 330, such as a lookup table, database, or other data structure.

In some implementations, policy identification logic 320 may be further configured to monitor accesses/information for a number of users and network devices 105. In this manner, concurrent user accesses from different network devices 105 or different host networks may be identified and used to prevent unauthorized access/authentication. For example, a first user accessing a first resource from a first network in a first location may be identified. Concurrently, an authentication may be performed for the first user at a second network or a second location. Policy identification logic 320 may identify the incongruities of the concurrent accesses and may be configured to suspend user access and notify security personnel of a possible breach.

Figure 4:
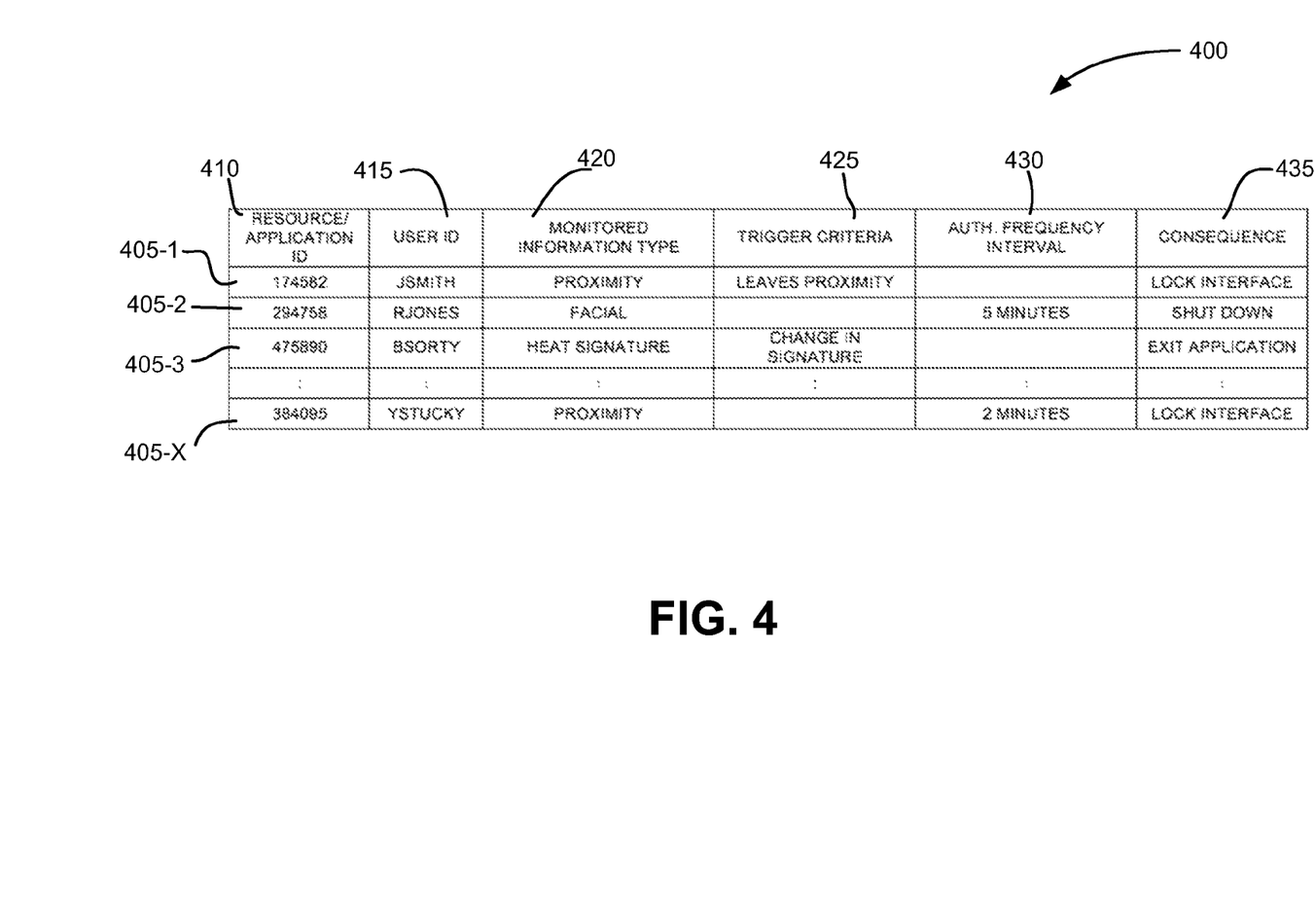
FIG. 4 is a block diagram illustrating an exemplary security policy table.

FIG. 4 is a table 400 of exemplary security policies for a number of users, groups/classes of users, and/or applications/resources. For example, as shown, security policy table 400 may include a number of entries 405-1 to 405-x (collectively referred to as "entries 405" and individually as "entry 405"). Each entry 405 in security policy table 400 may correspond to a particular user/application (or user/resource) pair. That is, security policy entries may be provided for combinations of users and applications/resources, such that, upon receipt of user identification and resource/application information from a network device 105, policy identification logic 320 may identify one or more matching entries 405. An entry 405 may include a resource/application identifier field 410, a user identification field 415, a monitored information type field 420, a triggering criteria field 425, an authentication frequency interval field 430, and a consequence field 435. Security policy table 400 may include more, fewer, or different fields than shown in FIG. 4.

Resource/application identifier field 410 may include a value representing a particular application or resource being accessed, run, or executed at network device 105. In some implementations, the resource/application identifier value may include a number or sequence of alphanumeric characters that uniquely identify a particular resource/application or class of resources/applications (e.g., high security level applications, low security level applications, etc.).

User identification field 415 may include a value representing an authenticated user. For example, the value in user identification field 415 may include a username, user identification number, etc. As described above, the combination of resource/application information and user identification information may comprise a pair of information by which policy entries in table 400 may be identified.

Monitored information type field 420 may include a value representing a type of information to be monitored as use state and monitored state information. For example, as shown in entry 405-1, the monitored information type field 420 may include the value "proximity." This value may indicate that information received from a proximity detector (e.g., a badge or RFID reader) associated with network device 105 is to be used to provide the use state and monitored state information. In some implementations, monitored information type field 420 may be omitted and a default type of monitored information may be used for all policies.

Triggering criteria field 425 may include a value representing an event, the occurrence of which, triggers re-authentication of a user of the associated resource/application. For example, as shown in entry 405-1, an exemplary triggering criteria field value may be "leaves proximity." This value may indicate that re-authentication of the user is to be performed when network device 105 determines that the user has left the proximity of network device 105.

As an alternative to triggering criteria field 425, some entries 405 may include a value in authentication frequency interval field 430. A value in authentication frequency interval field 430 may indicate that re-authentication based on monitored information is to be performed periodically at predetermined intervals. As shown in entry 405-2, an exemplary authentication frequency interval field value may be "5 minutes." This value may indicate that re-authentication of the user is to be performed every five minutes, regardless of the occurrence of any other event.

Consequence field 435 may include a value representing a consequence of a failed re-authentication attempt. For example, as shown in entry 405-1, an exemplary consequence field value may include "lock interface." This value may indicate that the user session with the particular resource/application is to be maintained, but that the user interface is locked-out in the event of a failed re-authentication. Other exemplary consequence field values may include "exit application," "shut down," and "alert security."

Returning to FIG. 3, upon receipt of the resource and user identification information, e.g., from network devices 105, policy identification logic 320 may lookup an applicable security policy or policies in table 400. In some implementations, multiple tables may be used. For example, a first table may provide a correlation between a particular user (e.g., a username or user identification number) and a particular class or privilege level, e.g., "level 1 employee," "level 2 employee," "owner," etc. In this implementation, a second table may specify the security policy. In other implementations, entries in table 400 may be provided on per user and/or per resource level granularity.

Policy enforcement logic 340 may be configured to execute identified security/authentication policies. For example, upon identification of an applicable security/authentication policy, e.g., by policy identification logic 320, policy enforcement logic 340 may transmit the rules associated with the policy to network device 105, such as via interface logic 310. In implementations in which monitored state authentication application 300 is executing on a particular network device 105 (e.g., as a stand alone application), rules associated with identified security/authentication policies may be directly applied to the network device 105. As described in additional detail below, with respect to FIG. 5, implementation of the identified policies may include suspending user access, requiring re-authentication, saving a session state and disabling access to a resource (e.g., "locking out" the user), notifying security, logging the occurrence, etc. In some implementations more than one consequence may occur in the event of a failed re-authentication attempt.

Figure 5:
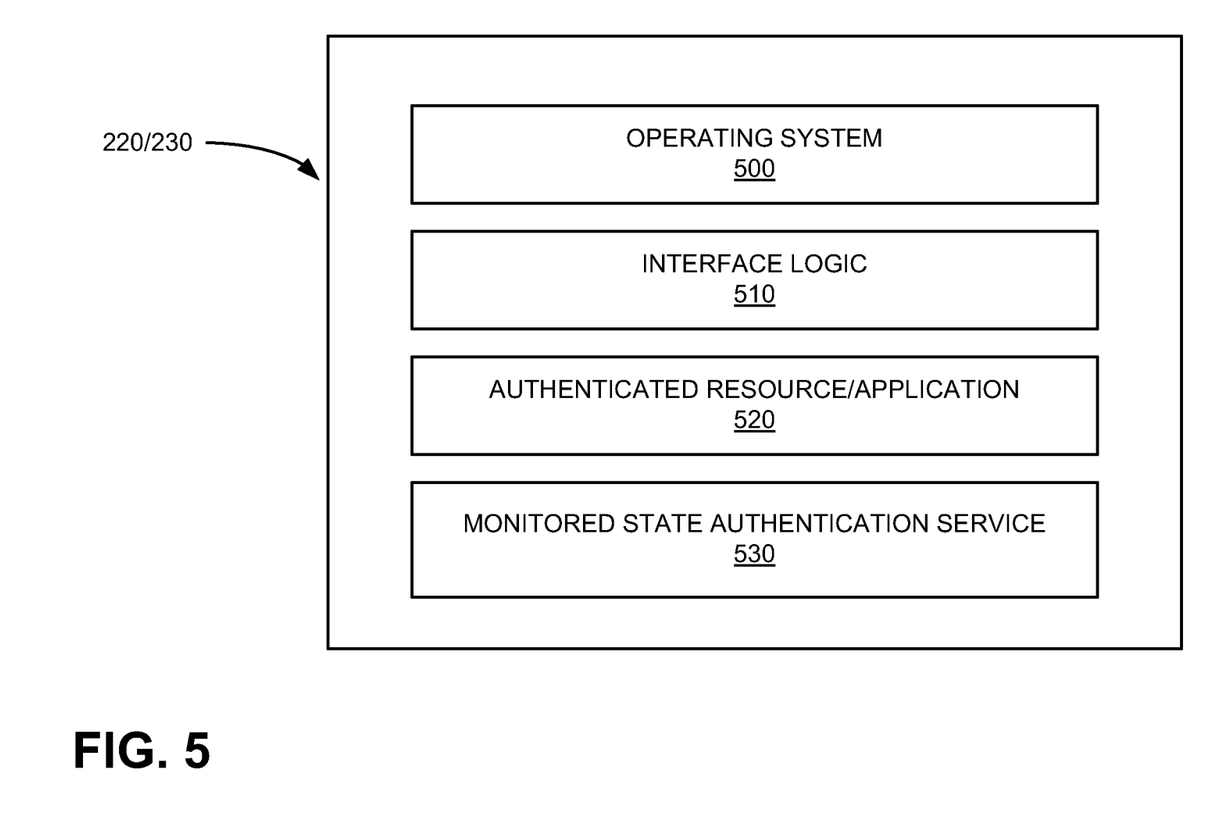
FIG. 5 is a functional block diagram of additional exemplary components implemented in the network device of FIG. 1.

FIG. 5 is a functional block diagram of exemplary components implemented in network device 105, such as a workstation, personal computer, access terminal, etc. In contrast to the description relating to FIG. 4, the functional components of FIG. 5 relate to the manner in which the monitored state authentication process may be interleaved or incorporated into the functioning of network device 105.

The logical blocks illustrated in FIG. 5 may be implemented in software, hardware, a combination of hardware and software. In alternative implementations, some or all of the components illustrated in FIG. 5 may be implemented in other devices or combinations of devices. Referring to FIG. 5, memory 230 may include an operating system 500, interface logic 510, authenticated resource/application 520, and monitored state authentication service 530.

Operating system 500 may include software instructions for managing hardware and software resources of network device 105. Operating system 500 may manage, for example, its file system, device drivers, communication resources (e.g., radio receiver(s), transmission control protocol (TCP)/IP stack), event notifications, etc. Operating system 500 may include Microsoft Windows, Apple® OS X, a variant of Linux or Unix (e.g., Ubuntu, Red Hat, etc.), an embedded operating system, a mobile operating system, etc.

Interface logic 510 may include logic configured to receive and/or transmit information from/to input or output devices, as well as remote devices or resources. In some implementations, interface logic 510 may include input device logic for receiving information/instructions from input devices, such as keyboards, keypads, cameras, sensors, microphones, etc. Interface logic 510 may be further configured to include output device logic for transmitting information/instructions to output devices, such as printers, monitors, display elements (e.g., light emitting diodes), etc. Interface logic 510 may also include communication logic for transmitting or receiving information from/to other devices, such as authentication server 120, other network devices 105, peripheral devices (e.g., USB devices), etc.

Authenticated resource/application 520 may include any software program or an element of a software program (e.g., a browser process) executed by processor 220. Authenticated resource/application 520 may display content items or elements to the user via display 130. Exemplary authenticated resources/applications 520 include Internet browsers, database applications, financial applications, communication sessions with designated resources, etc. As used herein, the term "authenticated resource/application" may refer to any application or resource, access to which requires user authentication.

Consistent with implementations described herein, authenticated resource/application 520 may include initial authentication logic 540. Initial authentication logic 540 may include software or hardware configured to provide and enforce initial authentication requirements (e.g., authentication credentials) prior to providing access to authenticated resource/application 520. For example, a medical patient information application may require that a user enter a username and password or other authentication credentials prior to accessing stored patient records. Initial authentication logic 540 may interact with input and output devices (e.g., a keyboard and a display) to exchange authentication information with the user.

Monitored state authentication service 530 may include software, hardware, or a combination of hardware and software configured to interact with and support authenticated resource/application 520 to enhance security of authenticated resource/application 520. In one embodiment, monitored state authentication service 530 may be executed as a service or application (e.g., a "shim" application) running between authenticated resource/application 520 and a user interface provided via interface logic 510. In one embodiment, monitored state authentication service 530 may capture or receive user and resource information from authenticated resource/application 520. In other embodiments, monitored state authentication service 530 may maintain a table or listing of associated resources or applications and may compare running applications or accessed resources to determine whether to invoke monitored state authentication service 530.

When it is determined that monitored state authentication service 530 should be invoked, monitored state authentication service 530 may transmit, at a time of initial user authentication, user and resource/application information and "use state" information to monitored state authentication application 300, described above in FIG. 3. In some implementations, monitored state authentication application 300 may be executed on a centralized or remote device, such as authentication server 120. However, in other implementations, monitored state authentication application 300 may be executed as a stand-alone application on network device 105.

Additionally, in some implementations, the initial use state information may be obtained upon the receipt of instructions from monitored state authentication application 300. For example, monitored state authentication application 300 may determine (as part of the security policy lookup) that a particular user accessing a particular resource or application should provide a particular type of use state information, e.g., biometric information. In this case, monitored state authentication service 530 may, in response to the instructions, capture or determine the requested use state information and transmit the information to monitored state authentication application 300.

In any event, as described above, use state information may include monitored information relating to the user, such as biometric information, access control information, etc. and may be used by monitored state authentication application 300 to establish a baseline with respect to subsequent monitored state authentication determinations. In some implementations, the use state information may include recognition/ identification information for more than one concurrent user. For example, facial recognition may be performed for a number of simultaneous users (e.g., a group of users working together on an application), thereby allowing any of the users to maintain access to authenticated resource/application 520 even in the absence of other users.

In some implementations, monitored state authentication application 300 may maintain a log or listing of users and accessed applications/resources. As described above, monitored state authentication application 300 may track user accesses across different locations or networks to facilitate identification of incongruous concurrent accesses by a same user.

At times subsequent to the initial authentication by authenticated resource/application 520, monitored state authentication service 530 may obtain or capture monitored state information consistent with the initially obtained use state information. This may be referred to as a supplemental authentication, different from the initial authentication. For example, when the use state information comprises facial recognition information for a particular user (or group of users), subsequent monitored information may also include facial recognition information.

The monitored state information may be obtained periodically, or upon occurrence of particular triggering events. For example, continuing with the facial recognition example, monitored state authentication service 530 may determine when a user steps away from network device 105. In such instances, monitored state authentication service 530 may capture monitored state information upon a return of a user. The monitored state information is then transmitted to monitored state authentication application 300 for comparison to the use state information previously captured. When the two items of information (e.g., the use state information and the monitored state information) do not match, monitored state authentication service 530 may receive a notification from monitored state authentication application 530 indicated that user authentication cannot be established.

In one embodiment, upon the receipt of such an indication, monitored state authentication service 530 may lock out (e.g., restrict access to prevent input or output interaction) the current user from the authenticated resource/application 520. In some implementations, monitored state authentication service 530 may overlay a graphical user interface associated with authenticated resource/application 520 and may prevent input into authenticated resource/application 520 via peripheral input devices, such as keyboards, mice, etc. A visual and/or audible notification may be provided, indicating that the user cannot be identified and requested that the user logout and re-authenticate with their own credentials.

In other implementations, a current state of authenticated resource/application 520 may be saved by monitored state authentication service 530 and authenticated resource/application 520 may be subsequently suspended or closed, thereby preventing accessing or interaction with non-authenticated users. Upon return of the initial user (e.g., as recognized by a comparison of updated monitored state information), monitored state authentication service 530 may resume authenticated resource/application 520 using the saved state information.

In some embodiments, time-out/log out criteria associated with authenticated resource/application 520 may be maintained. For example, some authenticated resource sessions are configured to automatically log out after a period of inactivity. Consistent with implementations described herein, these criteria may be implemented in parallel. For example, if monitored state authentication service 530 (in combination with monitored state application 300) lock out authenticated resource/application 520 prior to the expiration of the period of inactivity (or other de-authentication criteria), the user may be logged out of authenticated resource/application 520 during the time in which interaction is locked out. In such circumstances, monitored state authentication service 530 may be notified of the logout and may remove the interaction lock out, thereby enabling the user to re-login to authenticated resource/application 520.

Figure 6:
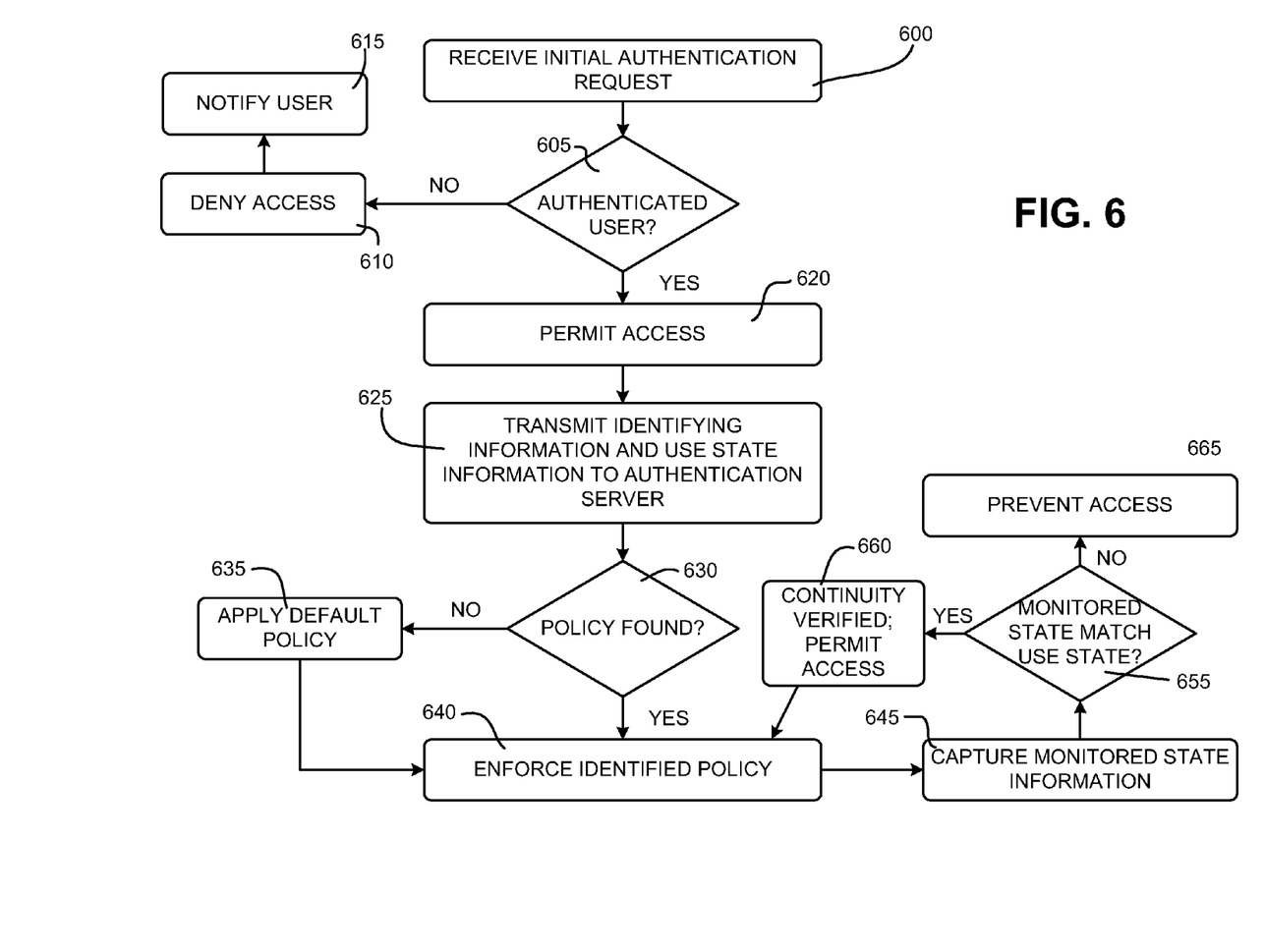
FIG. 6 is a flow diagram illustrating exemplary processing associated with providing an authenticated service in the embodiments described herein.

FIG. 6 is a flow diagram illustrating exemplary processing associated with providing a supplemental authenticated service in an embodiment described herein. Processing may begin with network device 105 (e.g., network device 105-1) receiving an initial authentication request from a first user (block 600). For example, authenticated resource/application 520 may receive an access/logon request from the first user via interface logic 510. As described above, the access/logon request may be specifically associated with resource/application 520 and may include login requests, entry of username/ password, biometric information (e.g., fingerprint, etc.).

Upon receipt of the initial authentication request, resource/ application 520 may perform user authentication and may determine whether the first user is an authenticated/authorized user (block 605). For example, the received username/ password may be checked or compared to a database of authorized users.

When the first user is not determined to be an authorized user (block 605—NO), authenticated resource/application 520 may deny access to the first user (block 610) and may notify the first user that access to resource/application is denied (block 615). However, when the first user is determined to be an authorized user (block 605—YES), authenticated resource/application 520 may permit user access to the contents of resource/application 520 (block 620).

Monitored state authentication service 530 may observe that the first user has been properly authenticated by authenticated resource/application 520 and may transmit information regarding the first user, resource/application 520, and use state information authentication server 120 (block 625). As described above, in some implementations, authentication server 120 may be incorporated into network device 105. In other implementations, authentication sever 120 may be accessible via network 110 and may be available to a number of network devices 105. Furthermore, in some instances, monitored state authentication service 530 may initially determine whether to apply enhanced security services to resource/application 520. For example, resource/application information may be compared to a table or listing of applications/resources for which monitored state authentication is to be performed. If resource/application 520 is not in the list, monitored state authentication service 530 may remain dormant and processing may end.

The user and resource/application information may include information known and/or shared with authenticated resource/application 520, such as a username or identification number, and a name/identifier associated with authenticated resource/application 520. The use state information may include monitored information relating to the environment/ conditions in which authenticated resource/application 520 is being executed. For example, as described above, use state information may include biometric information relating to the user(s), such as facial recognition information, presence location, proximity information, body heat signature information, etc. Other exemplary use state information may include access control information (such as whether a particular user is in a particular physical location or facility).

Monitored state authentication application 300 in authentication server 120 may determine whether an authentication/security policy matches the received user and resource/application information (block 630). For example, monitored state authentication application 300 may compare the received user and resource/application information to entries in a table of security policies, such as table 400.

If a matching security policy is not found (block 630—NO), a default authentication policy may be applied (block 635). However, when a matching security policy is found (block 630—YES), monitored state authentication application 300 may enforce the identified policy (block 640). For example, in some implementations, monitored state authentication application 300 may transmit information relating to the identified policy (e.g., monitored state authentication criteria, etc.) to monitored state authentication service 530 on network device 105. In this implementation, monitored state authentication service 530 may directly apply the policy criteria to user interactions with authenticated resource/application 520. In other implementations (e.g., a centralized enforcement embodiment), monitored state authentication application 300 may create an entry in an active authenticated session table relating to the received user information, resource/application information, and use state information, as well as the identified security policy criteria. In this implementation, monitored state authentication application 300 may instruct monitored state authentication service 530 on network device 105 to capture and transmit monitored state information in accordance with the identified policy (or policies).

In any event, monitored state authentication service 530 may, in accordance with enforcement of the identified security policy, capture additional instances of the monitored information that initially formed the basis of the use state information (referred to above as "monitored state" information (block 645). For example, when the use state information comprises facial recognition information for one or more users, monitored state information may also comprise facial recognition information at a later point in time, as directed by the applied security policy. In another example, the use state information may include access control information relating to the first user's physical location at the time of initial authentication. In this case, subsequently captured monitored state information may also include updated physical location information.

For particularly sensitive applications or resources, monitored state authentication service 530 may be instructed to capture monitored state information at short duration, periodic interval, such as every 15 seconds. For less sensitive applications or resources, monitored state authentication service 530 may be instructed to capture monitored state information at longer duration intervals.

In other implementations, an applied security policy may cause monitored state authentication service 530 to capture monitored state information upon the occurrence of a triggering event. Exemplary triggering events may include identified changes in environmental conditions, such as the number of or identifying characteristics (e.g., facial characteristics) of users.

Upon receipt of the monitored state information, monitored state authentication service 530 may transmit the monitored state information to monitored state authentication application 300 on authentication server 120. As noted above, in some instances the functions performed by authentication server 120 may be performed on network device 105 in a stand-alone fashion.

The monitored state information may be compared to the previously received use state information and it may be determined whether the two elements of information match one another (block 655). For example, facial recognition information received in the monitored state information may be compared to previously received use state facial recognition information. When there is a match (block 655—YES), the continuity of the user may be verified and access to resource/application 520 may be maintained (block 660). Processing may then return for block 640 for continued application of the identified security policy or policies.

However, when a match does not occur (block 655—NO), the continuity of the user may not be verified and access to resource/application 520 may be prevented (block 665). As described above, preventing access to resource/application 520 may be performed in a number of ways. In one implementation, the user may be logged out of resource/application 520, thereby prevent access from any user without re-logging in or re-authentication.

In other implementations, monitored state authentication service 530 may maintain the authenticated user's access, but may lock out or otherwise prevent viewing and interaction with authenticated resource/application 520. For example, monitored state authentication service 530 may provide an overlying graphical user interface over authenticated resource/application 520, indicating that the current user cannot be authenticated and asking the user to re-authenticate.

Consistent with this implementation, monitored state authentication service 530 may provide periodic keep-alive interaction with authenticated resource/application 520 to prevent automatic log-out of the authenticated user. In some embodiments, this feature may be designated in the applied security policy. When the initially authenticated user returns or desires to regain access, processing may return to block 645 described above, for re-authentication based on the initial use state information. Upon successful re-authentication, access to authenticated resource/application 520 may be provided.

In still other implementations, monitored state authentication service 530 may store active state information relating to the authenticated user's active session with authenticated resource/application 520. Authenticated resource/application 520 may be closed or otherwise suspended, thereby preventing unauthorized access. Upon return of, and re-authentication by, the initial user, monitored state authentication service 530 may reactivate authenticated resource/application 520 based on the stored active state information, thereby allowing the authenticated user to continued working within authenticated resource/application 520 in an efficient manner.

Implementations described herein relate to devices, methods, and systems for supplementing user authentication systems. In one implementation, use state information, such as biometric or presence information may be captured and associated with a particular user at a time of initial authentication to a resource or application. At a time subsequent to initial authentication, the use state information (referred to as "monitored state" information) may again be captured to verify that the current user matches the initially authenticated user. In some instances, this may be referred to as a supplemental authentication or, alternatively, a "re-authentication," different from the initial authentication. This subsequent information capturing may be performed periodically, or in response to a triggering event, such as the user's departure from the vicinity of the authenticating device, etc. When the current user cannot be re-authenticated, access to the authenticated resource or application may be prevented.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of blocks have been described with respect to FIG. 6, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
   receiving first monitored information relating to a user at a time of initial user authentication with a particular application or resource, wherein the first monitored information does not comprise information used to initially authenticate the user;
   determining that a second authentication is required at a second time subsequent to the time of initial user authentication;
   capturing second monitored information at the second time;
   comparing the second monitored information to the first monitored information to determine whether continued authentication is maintained; and
   preventing access to the particular application or resource when it is determined that continued authentication is not maintained,
   wherein preventing access further comprises:
      maintaining an authenticated user session with the particular application or resource; and
      locking an interface associated with the particular application or resource.

2. The computer-implemented method of claim 1, wherein the particular application or resource comprises a secured application or resource that requires user authentication prior to providing access.

3. The computer-implemented method of claim 1, wherein the second monitored information is a same type as the first monitored information.

4. The computer-implemented method of claim 1, wherein the first and second monitored information comprise user location information.

5. The computer-implemented method of claim 4, wherein the user location information comprises geographical location information, proximity location information, or access control location information.

6. The computer-implemented method of claim 1, wherein the first and second monitored information comprise user recognition information.

7. The computer-implemented method of claim 6, wherein the user recognition information comprises facial recognition information, fingerprint recognition information, retinal recognition information, palm print recognition information, heat signature recognition information, or voice recognition information.

8. The computer-implemented method of claim 1, further comprising:
   capturing third monitored information at a third time subsequent to the second time;
   comparing the third monitored information to the first monitored information; and
   restoring access to the locked interface associated with the particular application or resource when the third monitored information matches the first monitored information.

9. The computer-implemented method of claim 8, wherein determining that the second authentication is required, further comprises:
   receiving identification information regarding the particular application or resource;
   identifying a security policy associated with the identification information, wherein the security policy includes triggering criteria or authentication frequency interval information,
   wherein determining that the second authentication is required is based on the security policy.

10. The computer-implemented method of claim 1, wherein the receiving, determining, and comparing are performed on a second network device physically separate from a first network device on which the particular application or resource is being accessed.

11. The computer-implemented method of claim 10, further comprising:
   storing, at the second network device, a record of the user and the application;
   determining whether a second instance of the user and a second application or resource is received;
   determining whether the record of the user and the application and the second instance are incongruous; and
   preventing access to the particular application or resource and the second application or resource when it is determined that the record of the user and the application and the second instance are incongruous.

12. The computer-implemented method of claim 11, wherein determining whether the record of the user and the application and the second instance are incongruous comprises:
   determining whether a physical or network location of the record and the second instance are dissimilar.

13. A system for providing authentication continuity, comprising:
   an authentication resource configured to:

receive user authentication credentials from a user at a first time;

perform initial user authentication based on the received user authentication credentials; and establish an authenticated session with the user upon initial user authentication; and a monitored state authentication service configured to:

capture use state information relating to the user during initial user authentication, wherein the use state information does not comprise information used to perform the initial user authentication;

determine that a supplemental authentication is required at a second time subsequent to the initial user authentication;

capture monitored state information at the second time;

compare the monitored state information to the use state information to determine whether the user at the second time matches the user at the first time;

prevent access to the authenticated application or resource when it is determined that user at the second time does not match the user at the first time;

capture updated monitored state information at the third time subsequent to the second time;

compare the updated monitored state information to the use state information to determine whether the user at the third time matches the user at the first time; and restore access to the authenticated application or resource when it is determined that user at the third time matches the user at the first time.

14. The system of claim 13, wherein the monitored state authentication service is further configured to maintain the authenticated session while preventing access to the authenticated application or resource.

15. The system of claim 13, wherein the monitored state authentication service is further configured to prevent access to the authenticated application or resource by blocking input to or output from the authenticated application or resource.

16. The system of claim 13, further comprising:

an authentication server configured to:

receive information relating to the first user and the authenticated application or resource;

identify a security policy associated with the first user and the authenticated application or resource, wherein the security policy includes at least one of: the type of state information to be captured, the capture interval or triggering criteria, or consequence information; and transmit the identified security policy to the monitored state authentication service;

wherein the monitored state authentication service is further configured to:

receive the identified security policy and capture use state information, determine that the supplemental authentication is required, capture monitored state information, compare the monitored state information to the use state information to determine whether a current user matches the first user, and prevent access to the authenticated application or resource based on the identified security policy.

17. The system of claim 13, wherein the use state information and monitored state information comprise user location information or user recognition information.

18. The system of claim 13, further comprising:

an access control system for monitoring a presence of the first user, wherein the use state information and the monitored state information comprises presence information, wherein the presence information is received from the access control system.

19. A non-transitory computer-readable storage medium having stored thereon sequences of instructions which, when executed by at least one processor, cause the at least one processor to:

receive use state information relating to a user at a time of initial user authentication with a particular application or resource, wherein the use state information comprises user location information or user recognition information;

determine that a second authentication is required at a second time subsequent to the time of initial user authentication;

capture monitored state information at the second time;

compare the second monitored information to the first monitored information to determine whether continued authentication is maintained; and prevent access to the particular application or resource when it is determined that continued authentication is not maintained, wherein the instructions to prevent access to the particular application or resource further cause the at least one processor to:

maintain an authenticated user session with the particular application or resource; and lock an interface associated with the particular application or resource.

* * * * *